United States Patent [19]
Walstra

[11] 3,934,103
[45] Jan. 20, 1976

[54] LIQUID LEVEL SENSING SWITCH
[75] Inventor: Hidde Walstra, Attleboro, Mass.
[73] Assignee: Texas Instruments Incorporated, Dallas, Tex.
[22] Filed: June 3, 1974
[21] Appl. No.: 475,468

[52] U.S. Cl................. 200/84 C; 340/59; 340/244
[51] Int. Cl.² ........................................ H01H 35/18
[58] Field of Search ....... 200/84 C, 81.9 M; 73/308, 73/313; 340/244, 59; 335/205–207

[56] References Cited
UNITED STATES PATENTS

| | | | |
|---|---|---|---|
| 2,783,326 | 2/1957 | Hanson et al. | 200/84 C |
| 2,927,176 | 3/1960 | Auld, Jr. et al. | 200/84 C |
| 3,103,562 | 9/1963 | Dinoia | 335/205 |
| 3,750,124 | 7/1973 | Barnes et al. | 200/84 C |

FOREIGN PATENTS OR APPLICATIONS
1,115,833  5/1968  United Kingdom ............... 200/84 C Primary Examiner—David Smith, Jr.
Attorney, Agent, or Firm—James P. McAndrews; John A. Haug; Russell E. Baumann

[57] ABSTRACT

A liquid level sensing switch has an open ended chamber in an electrically conductive body, has an insulating bushing disposed in the open end of the body chamber and has a contact member extending through the bushing to dispose one end of the contact member in spaced relation to the body at the closed end of the body chamber. An electrically conductive magnetizable ball is disposed in the chamber for movement between a closed circuit position engaging both the body and the contact member and an open circuit position spaced from one of these components. A float is mounted on the body exteriorily of the chamber and carries a magnet so that movement of the float between two positions outside the body in response to change in liquid level is effective to move the ball between open and closed circuit positions within the body chamber.

9 Claims, 4 Drawing Figures

LIQUID LEVEL SENSING SWITCH

Liquid level sensing switches could be used in a great many different applications where it is important to know that a proper liquid level is being maintained. Such switches could be used, for example, in sensing the liquid levels in automotive brake cylinders, in automotive oil reservoirs, and in various oil-filled, water-filled, or fuel-filled containers of many different kinds. In many of these applications however, the switching device must be extremely compact in order to be properly accommodated in the device to be monitored. The devices must also be very inexpensive and must be adapted to perform reliably throughout very long service lives. Frequently, where a float is to be used in sensing the level of a liquid, the float must be of substantial size in order provide the required switching forces in a sealed switch device. Thus the required size of the float causes problems in accommodating the level sensor in systems to be monitored. Further, such devices tend to be relatively expensive in order to achieve long service lives in environments where liquids are continually present. That is, the requirements for sealing and the requirements for providing switching movement in a sealed structure have tended to require relatively expensive structures. As a result of these various factors, the use of liquid level sensing switches in many applications where the switches could be desirably employed is frequently barred for reasons of space, economy or device reliability.

It is an object of this invention to provide a novel and improved liquid level sensing switch; to provide such a switch which is of compact construction; to provide such a device which is versatile in application; to provide such a device which is inexpensive to manufacture; and to provide such a device which is of rugged, reliable and long lasting construction.

Other objects, advantages and details of the liquid level sensing switch of this invention appears in the following detailed description of preferred embodiments of the invention, the detailed description referring to the drawings in which.

Figure 1:
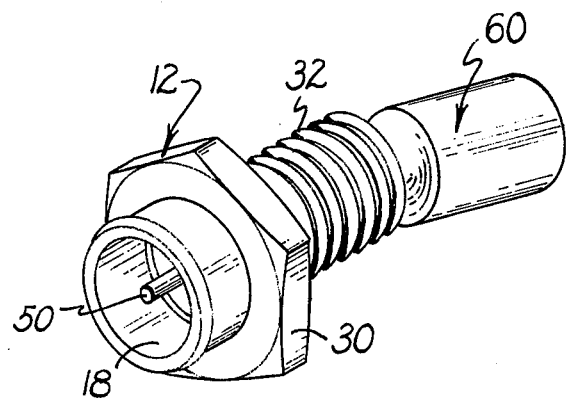
FIG. 1 is a perspective view of a liquid level sensing switch of this invention.
Figure 2:
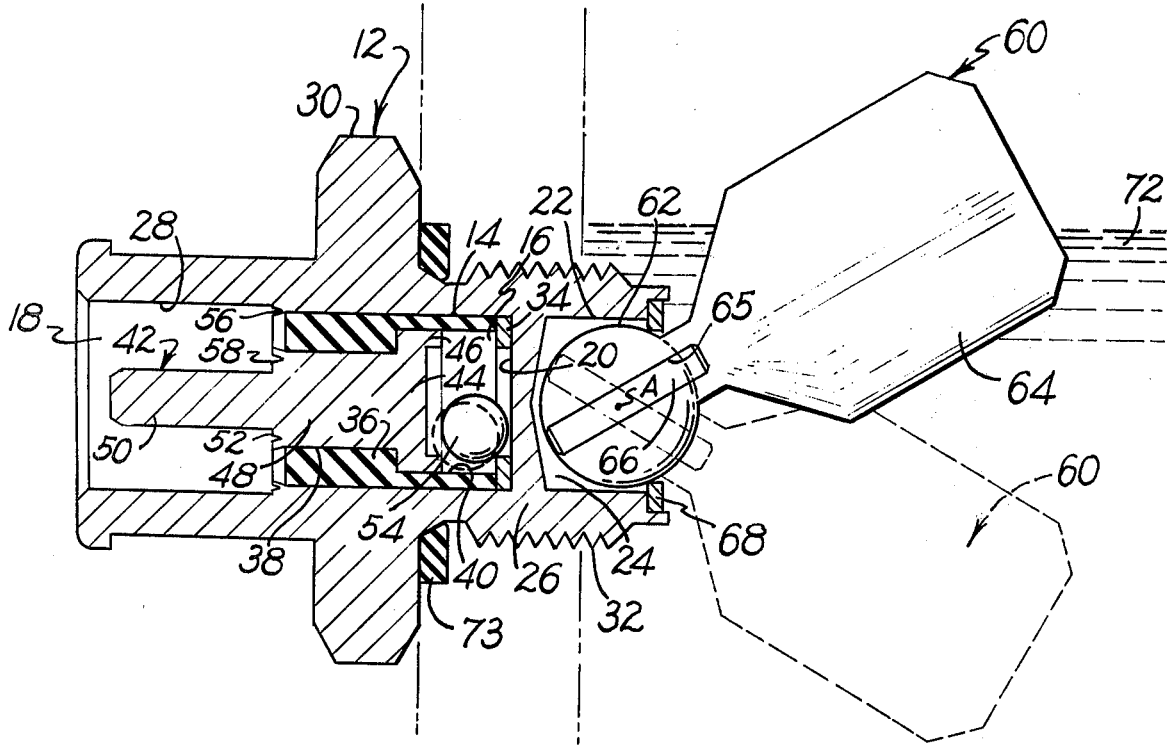
FIG. 2 is a section view to enlarged scale along line 2—2 of FIG. 1.

Referring to the drawings, 10 in FIGS. 1 and 2 indicates a preferred embodiment of the liquid level sensing switch of this invention. As illustrated, the switch 10 includes a body 12 which has a bore 14 therein at one end forming a body chamber 16 which is open at one end 18 and closed at one end 20. The body 12 also has a second bore 22 at the opposite end of the body forming a socket chamber 24 in the body which is separated from the body chamber 16 by a thin wall portion 26 of the body. The body 12 is formed of an electrically conductive and preferably non-magnetic material such as brass, copper, aluminum or more preferably stainless steel. In the preferred embodiment of this invention, the body 12 preferably has a counterbore 28 at the open end of the body chamber, has hexagonal surfaces 30 formed on an exterior surface of the body and has screw threads 32, which may be pipe threads if desired, formed on another exterior portion of the body. As will be understood the body construction is inexpensively formed by machining from a hexagonal rod or the like and provides a strong rigid and long lasting housing for the switch 10.

In accordance with this invention, an electrically conductive washer or annular ring 34 is disposed at the closed end of the body chamber 16 in electrically conductive relation to the body. Preferably, the washer 34 is formed of an inexpensive non-magnetic metal such as brass but is plated with a precious metal such as gold or silver or the like for providing the washer with low electrical contact resistance surfaces.

An electrically insulating bushing 36 having a central aperture 38 and preferably having a counterbore 40 at one end of that aperture is then combined with an electrical contact member 42. Desirably, for example, the contact member has a generally cup-shaped head 44 having a cup rim portion 46 and has a shank portion 48 extending from the head 44. If desired, the shank portion of the contact member has a reduced diameter portion 50 forming a shoulder 52 on the contact member. As shown in FIG. 2, the contact member shank is fitted into the aperture in the bushing 36 with the cup-shaped head of the contact member being disposed in the bushing counterbore 40. An electrically conductive magnetizable ball 54 is also provided. The bushing with the contact member mounted therein is then disposed in the open end of the body chamber 16 with the ball 54 so that the counterbored end of the bushing bears against the washer 34 for holding the washer in position at the closed end of the body chamber and so that the ball 54 is enclosed within the body chamber 16 as shown in FIG. 2. The body is then preferably staked or otherwise deformed as at 56 and the contact member shoulder 52 is similarly staked as at 58 for securing the contact member, bushing, body and ball in the desired assembled relation. If desired, the bushing 36 is formed of a compressible rubber or elastomeric material for sealing the open end of the body chamber when compressed by the staking 56 and 58. Alternately, if desired, the bushing 36 is cemented or otherwise secured in the body chamber 16. Where cementing is used, the bushing is typically formed of a relatively rigid electrically insulating material such as a phenolic resin or glass-filled nylon or the like. The contact member 42 is desirably formed of copper or brass or the like and the ball 54 is preferably formed of low carbon steel or other readily magnetizable metal and has an outer surface coating of a precious metal such as silver or gold providing the ball surfaces with low electrical contact resistance.

In accordance with this invention, a float 60 is also embodied in the switch 10, this float having a ball portion 62 at one end and a bouyant portion 64 at its opposite end. The ball portion of the float has a bore 65 therein and has a magnet rod 66 secured in that bore in any conventional manner. Typically, the magnet rod is press fitted into the bore 64 and is therefore easily adjusted in the bore as may be desired. The ball portion of the float provides a pivot point for the float indicated at A in FIG. 2 as is hereinafter described and accordingly, the magnet 66 is desirably positioned in the float bore 64 so that the weight of the magnet rod 66 falls partly on either side of the pivot point so that only a selected force is required to be applied to the bouyant portion of the float for pivoting the float. Typically, for example, the magnet 66 is positioned in the float bore 65 so that the weight of the float and magnet to the right of the pivot point A (as seen in FIG. 2) only slightly exceeds the weight of the portions of the float and magnet disposed to the left of the pivot point A. In this arrangement, the right hand side of the float as viewed in FIG. 2 moves down in response to gravity but is easily lifted upwardly in response to a force of bouyancy as will be understood. In this proportioning, only a very small float is required for moving the magnet in the manner hereinafter described. Preferably, the float 60 is formed of polyethylene or the like having a solid ball portion and a hollow bouyant portion, the end of the hollow bouyant portion being closed by cementing or heat-sealing in any conventional manner as desired. The ball portion of the float is disposed in the socket chamber 24 of the switch body 12 and is secured therein by a conventional C-clip or retaining ring 68 or the like as shown in FIG. 2.

In this arrangement, the switch 10 is adapted to be easily mounted in the wall of a tank, such as is indicated in FIG. 2 by the broken lines 70, by means of the screw threads 32 for exposing the float 60 to a liquid 72 within the tank. If desired, an O-ring gasket or the like 73 is clamped between the switch and the tank 70 for sealing the tank opening which receives the switch 10. The float 60 is then adapted to be pivoted around point A between a first position shown in solid lines in FIG. 2 to a second position shown in broken lines in FIG. 2 in response to change in the level of the liquid 72 to which the float is exposed. As will be understood, movement of the float also moves the magnet 66 with the float. Accordingly, when the float is in the first position noted above, the magnet 66 is spaced at a substantial distance from the magnetizable ball 54 so that the ball is retained in the closed circuit position shown in broken lines in FIG. 2 where the ball engages both the rim portion 46 of the contact member and the washer 34 forming an electrical circuit from the contact member, through the ball and the washer to the switch body 12. However, when the float 60 moves to the second position shown in solid lines in response to change in the level of the liquid 72, the magnet 66 is brought closer to the ball 54 lifting the ball around the inner diameter edge of the washer 34 into an open circuit position wherein the ball is spaced from the contact member 42. Of course, as the float 60 returns from the second position to the first position of the float, the magnet 66 is unable to lift the ball 54 away from the washer 34 and the ball is released to be returned to closed circuit position by the force of gravity.

In this arrangement, the components of the switch which make electrical contact with each other are inexpensively sealed from the liquid 72 and are retained in good condition throughout a long service life. The ball 54, being round, engages fresh contact surfaces with the washer 34 and the contact member rim 46 each time that a new contact is made during open and closing of switch circuits. As a result, good electrical contact is consistently achieved between the ball and the washer 34 and contact member 42 with minimum contact sticking. Accordingly, a very small float 60 is effective to move a small magnet 66 to provide the force necessary for accomplishing switching in the device 10.

Figure 3:
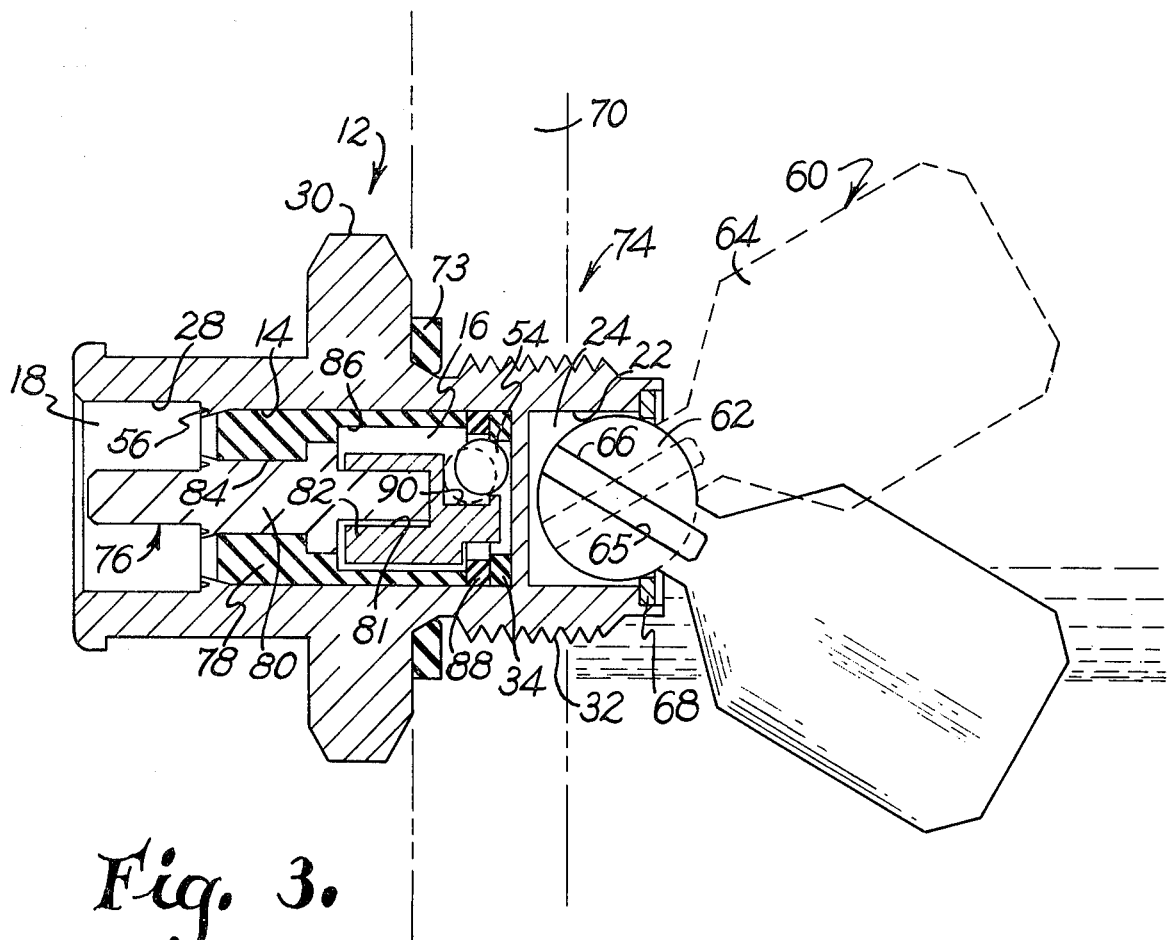
FIG. 3 is a section view similar to FIG. 2 illustrating an alternate embodiment of the liquid level sensing switch of this invention.

Another alternate embodiment 74 of the switch of this invention is shown in FIG. 3 wherein components of the switch 74 similar to components of the switch 10 are identified by corresponding reference numerals. As shown in FIG. 3, the switch 74 includes a body 12 having a bore 14 forming a body chamber 16 and having a second bore 22 forming a socket chamber 24. A float 60 has a ball portion 62 of the float secured in the socket chamber 24 by a C-clip 68 and has a bouyant portion 64 exposed to a liquid 72. In addition, an electrically conductive washer 34 is disposed within the body chamber as shown in FIG. 3. In the switch 74, however, contact means 76 mounted in an electrically insulating bushing 78 includes a contact stud 80 having a contact rotor 82 which is freely rotatable on a portion of the stud 80. That is, the insulating bushing 78 has a central aperture 84 and a counterbore 86. This bushing has the stud portion of the contact means 76 mounted in the bushing aperture and supports the rotor 82 for rotation within the body chamber 16 by disposing an axial bore 81 in the rotor over the stud 80. A spacer 88 such as a ring of glass-filled nylon or the like is disposed within the chamber 16 between the counterbored end of the bushing and the washer 34 so that staking of the body as at 74 secures the bushing, the spacer 88 and the washer within the body chamber 16 and so that the spacer 88 retains the contact rotor 82 on the stud portion of the contact means 76. In the switch 74, the contact rotor 82 has a recess 90 on one side as shown in FIG. 3 and the opposite side of the rotor is accordingly weighted so that the rotor moves in response to the force of gravity for disposing the rotor recess 90 at a selected position relative to the axis of the contact stud 80.

In the switch 74, the ball 54 is normally rested in an open circuit position within the rotor recess 90, as shown in broken lines in FIG. 3, when the float 60 of the switch 74 is in its first position, also shown in broken lines in FIG. 3. However, when the float 60 is moved to its second position, as shown in solid lines in FIG. 3, in response to change in the level of the liquid 72, the magnet 66 carried by the float is brought closer to the ball 54 and lifts the ball into a closed circuit position shown in solid lines in FIG. 3 wherein the ball contacts both the rotor 82 and the washer 34. In closed circuit position, the ball 54 closes a circuit between the contact stud 80, the rotor 82, the washer 34 and the switch body 12. Of course, as the float returns to its first position in response to another change in liquid level, the ball returns to a position nested in the recess 90.

Figure 4:
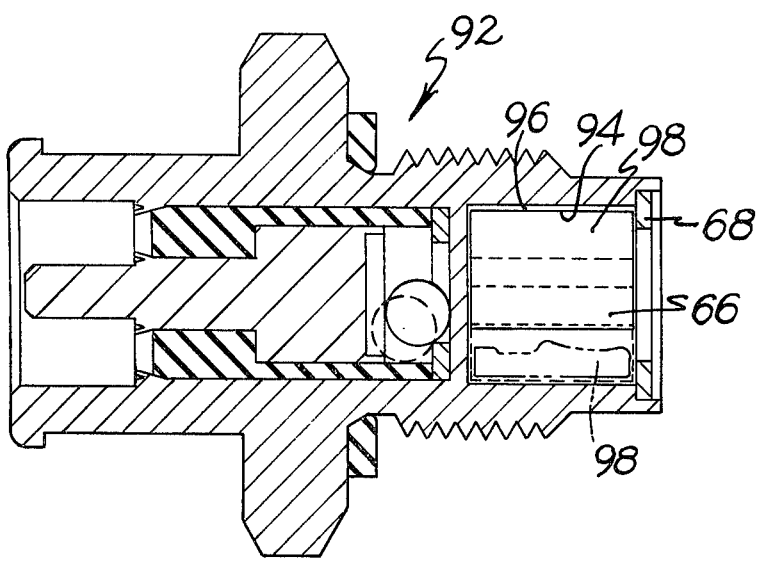
FIG. 4 is a section view similar to FIG. 2 illustrating another alternate embodiment of the liquid level sensing switch of this invention.

Another alternative embodiment 92 of the switch of this invention is shown in FIG. 4 wherein components of the switch 92 similar to components of the switch 10 are identified by corresponding reference numerals. As shown in FIG. 4 the switch 92 includes a body 12 having a bore 14 forming a body chamber 16 and has a second bore 94 forming an open ended float chamber 96 of selected cylindrical size at the opposite end of the body. An insulating bushing 36 mounts an electrical contact member 42 in the body chamber 16 as in switch 10 previously described and an electrically conductive magnetizable ball 54 is enclosed within the body chamber. In this arrangement, the ball is disposed for movement between a closed circuit position shown in broken lines in FIG. 4 wherein the ball engages the contact member 42 and the body 12 and an open circuit position as shown in solid lines in FIG. 4 wherein the ball is spaced from the contact member 42. In the switch 92 however, a float 98 is formed of a bouyant material in the form of a cylinder of a size relatively smaller than the size of the float chamber 96 previously described. This float 98 has a magnet rod 66 longitudinally disposed within the float in any conventional manner, the rod preferably being spaced at one side of the central axis of the float.

In this arrangement, the float 98 is responsive to changes in the level of a liquid permitted to enter the open end of the float chamber 96 as will be understood. The magnet rod in the float weights the float so that the magnet is normally disposed at the lower side of the float. With a relatively low level in the liquid to which the float is exposed, the float drops to the lower side of the float chamber 96 (as viewed in FIG. 4) and provides a positive magnetic force holding the ball 54 in a closed circuit position shown in broken lines in FIG. 4 wherein the ball engages both the washer 34 and the contact member 42. On the other hand, as the liquid level rises, raising the float 98 in the float chamber, the magnet 66 lifts the ball 54 to the open circuit position shown in solid lines in FIG. 4. The round configuration of the ball 54 permits the float to move up and down with liquid level changes even though the float is of relatively small size.

It should be understood that although preferred embodiments of the liquid level sensing switch of this invention have been described by way of illustrating the invention, this invention includes all modifications and equivalents of the described embodiments falling within the scope of the appended claims.

I claim:

1. A liquid level sensing switch comprising an electrically conductive body having a chamber open at one end, electrical contact means, electrically insulating means mounting said contact means within said chamber in electrically insulated relation to said body with one end of said contact means in spaced relation to said body within said chamber and with an opposite end of said contact means extending from said chamber, an electrically conductive magnetizable ball movable within said chamber between a closed circuit position engaging said contact means and body and an open circuit position spaced from one of said contact means and body, a float mounted on said body exteriorly of said chamber for movement between first and second positions in response to change in level of a liquid to which said float is exposed, and magnet means movable with said float exteriorly of said chamber for moving said ball between said open and closed circuit positions within said chamber in response to movement of said float between said first and second positions exteriorly of said chamber, said body having a bore at one end forming said chamber and having a bore at an opposite end forming a socket, said bores being separated by a wall portion of said body between said bores, said float having a ball portion at one end secured in said socket for permitting pivotal movement of said float on said body and having a bouyant portion at its opposite end to be exposed to a liquid, and said magnet means being mounted in said ball portion of said float.

2. A liquid level sensing switch comprising an electrically conductive body having a chamber open at one end, electrical contact means, electrically insulating means mounting said contact means within said chamber in electrically insulated relation to said body with one end of said contact means in spaced relation to said body within said chamber and with an opposite end of said contact means extending from said chamber, an electrically conductive magnetizable ball movable within said chamber between a closed circuit position engaging said contact means and body and an open circuit position spaced from one of said contact means and body, a float mounted on said body exteriorly of said chamber for movement between first and second positions in response to change in level of a liquid to which said float is exposed, and magnet means movable with said float exteriorly of said chamber for moving said ball between said open and closed circuit positions within said chamber in response to movement of said float between said first and second positions exteriorly of said chamber, said body having a bore at one end forming said chamber and having a bore at an opposite end forming a second open ended body chamber of selected cylindrical size, said float comprising a buoyant cylinder of relatively smaller cylindrical size having a magnet rod mounted longitudinally within said cylinder spaced from the center of said cylinder, said float being secured in said second body chamber to be responsive to change in level of a liquid permitted to enter said second chamber for moving said float between said first and second positions within said second chamber.

3. A liquid level sensing switch comprising an electrically conductive body having a chamber open at one end, electrical contact means, electrically insulating means mounting said contact means within said chamber in electrically insulated relation to said body with one end of said contact means in spaced relation to said body within said chamber and with an opposite end of said contact means extending from said chamber, an electrically conductive magnetizable ball movable within said chamber between a closed circuit position engaging said contact means and body and an open circuit position spaced from one of said contact means and body, a float mounted on said body exteriorly of said chamber for movement between first and second positions in response to change in level of a liquid to which said float is exposed, and magnet means movable with said float exteriorly of said chamber for moving said ball between said open and closed circuit positions within said chamber in response to movement of said float between said first and second positions exteriorly of said chamber, said electrical contact means comprising a contact stud and said electrically insulating means comprising a bushing fitted around said stud for disposing one stud end within said body chamber and for disposing an opposite stud end extending from said body chamber.

4. A liquid level sensing switch comprising an electrically conductive body having a chamber open at one end, electrical contact means, electrically insulating means mounting said contact means within said chamber in electrically insulated relation to said body with one end of said contact means in spaced relation to said body within said chamber and with an opposite end of said contact means extending from said chamber, an electrically conductive magnetizable ball movable within said chamber between a closed circuit position engaging said contact means and body and an open circuit position spaced from one of said contact means and body, a float mounted on said body exteriorly of said chamber for movement between first and second positions in response to change in level of a liquid to which said float is exposed, and magnet means movable with said float exteriorly of said chamber for moving said ball between said open and closed circuit positions within said chamber in response to movement of said float between said first and second positions exteriorly of said chamber, said electrical contact means comprising a contact stud and a contact rotor mounted for free rotation on one end of said stud, said rotor having a recess at one side thereof and being weighted to be responsive to gravity for positioning said recess at a selected location relative to the axis of said stud, said electrically insulating means comprising a bushing fitted around a portion of said stud for disposing said rotor for rotation within said body chamber and for disposing an opposite end of stud extending from said chamber, and said ball being normally disposed in said open circuit position within said recess but being adapted to be attracted from said recess into said closed circuit position by said magnet means when said float is in one of said float positions.

5. A liquid level sensing switch comprising an electrically conductive body having a pair of bores therein forming a body chamber having an open end and a closed end and having a socket spaced from said closed end of said body chamber by a thin wall, a washer plated with a precious metal disposed at said closed end of said body chamber in electrically connected relation to said body, an electrically insulating bushing having a central bore which is counterbored at one end, said bushing being disposed in said body chamber with said counterbored end of said bushing engaging said washer, a contact stud having a head disposed in said bushing counterbore and having a shank portion extending from said body chamber through said bushing aperture, an electrically conductive magnetizable ball disposed within said body chamber for movement between a closed circuit position engaging said washer and stud head and an open circuit position spaced from said stud head, a float having a ball postion at one end and a buoyant portion at its opposite end, said float having its ball portion secured in said body socket for permitting pivotal movement of said float between first and second positions in response to change in level of a liquid to which said buoyant portions of said float is exposed, and magnet means mounted on said float ball portions for movement with said float to move said ball between said open and closed circuit positions within said body chamber in response to movement of said float between said first and second positions exteriorly of said body chamber.

6. A switch as set forth in claim 5 wherein said body and contact chamber have staked portions compressing said insulating bushing for securing said bushing in said body chamber.

7. A switch as set forth in claim 6 wherein said ball comprises a precious metal coated steel ball.

8. A liquid level sensing switch comprising an electrically conductive body having a pair of bores therein forming a body chamber having an open end and a closed end and forming a float chamber of selected cylindrical size spaced from said closed end of said body chamber by a thin wall, an electrically conductive contact member having a cup portion with a cup rim and having a shank portion extending from the bottom of said cup portion, an electrically insulating bushing having a central aperture therein, said bushing being disposed in said body chamber and having said contact shank portion extending through said bushing aperture disposing said cup portion of said contact member in spaced relation to said closed end of said body chamber, an electrically conductive magnetizable ball movable within said body chamber between a closed circuit position engaging said body and said cup rim and an open circuit position engaging said body and spaced from said cup rim, a float comprising a buoyant cylinder of relatively smaller diameter than said float chamber movably mounted within said float chamber for movement between first and second positions in response to change in level of a liquid permitted to enter said float chamber, and a magnet rod mounted longitudinally within said buoyant float cylinder spaced from the central axis of said float cylinder for moving said ball between said open and closed circuit positions within said body chamber in response to movement of said float between said first and second positions within said float chamber.

9. A liquid level sensing switch comprising an electrically conductive body having a pair of bores therein forming a body chamber having an open end and a closed end and having a socket spaced from said body chamber by a thin wall, an electrically insulating bushing having a central aperture disposed in said open end of said body chamber, an electrical contact means having a stud portion mounted in said bushing aperture and having a rotor mounted for free rotation on one end of said stud within said body chamber, said rotor having a recess in one side thereof and being weighted for positioning said recess at a selected location relative to the central axis of said stud, an electrically conductive magnetizable ball movable between an open circuit position within said recess spaced from said body and a closed circuit position engaging said rotor and said body means, a float having a ball portion at one end and a buoyant portion at its opposite end, said float having its ball portion secured within said body socket permitting pivotal movement of said float between first and second positions in response to change in level of a liquid to which said float is exposed, and a magnet mounted on said ball portion of said float for moving said ball between said open and closed circuit positions within said body chamber in response to movement of said float between said first and second positions exteriorly of said body chamber.

* * * * *